Nov. 10, 1931.  N. A. LOPEZ  1,830,844
STARTING DEVICE
Filed Sept. 4, 1929   2 Sheets-Sheet 1
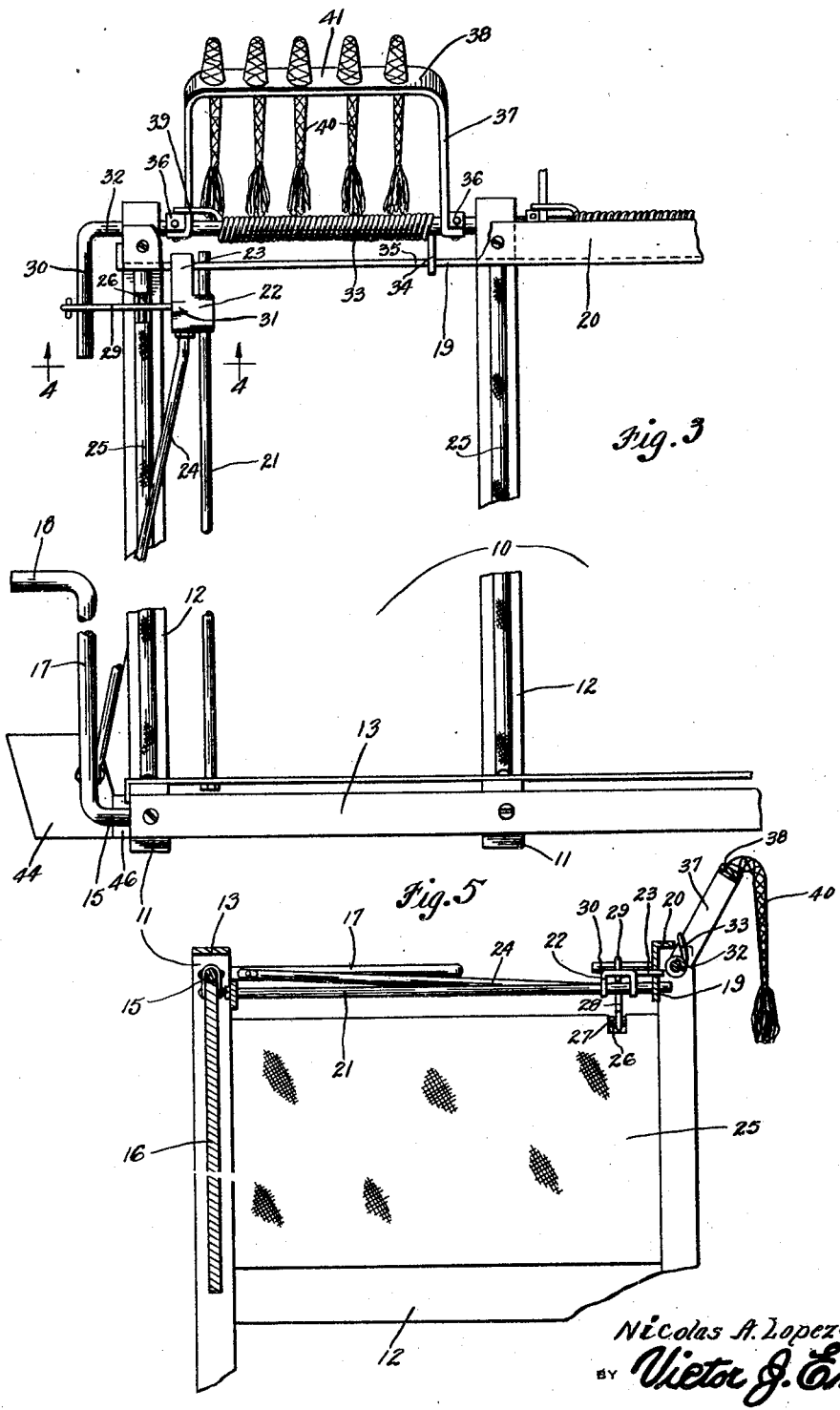

Patented Nov. 10, 1931

1,830,844

UNITED STATES PATENT OFFICE

NICOLAS ALVAREZ LOPEZ, OF CHICAGO, ILLINOIS, ASSIGNOR OF ONE-HALF TO JOHN J. THEIS, JR., OF CHICAGO, ILLINOIS

STARTING DEVICE

Application filed September 4, 1929. Serial No. 390,312.

This invention relates to certain novel improvements in starting devices and has for its principal object the provision of an improved construction of this character which will be highly efficient in use and economical in manufacture.

The invention is especially constructed and adapted to be used in connection with race courses over which race horses or other animals are adapted to race and among the several objects of the invention is to provide a device which will first facilitate the lining of the horses at the starting point and secondly after the horses have been lined whip the horses into action.

A still further object of the invention is to provide a device of this character which may be expeditiously moved about from one course to another according to the distance the horses or other animals are to run and it is the object to construct the device not only to make the same portable but to make the same free from sharp edges corners or the like which would otherwise be injurious to the horses and to separate the horses from view of each other.

Other objects will appear hereinafter.

The invention consists in the novel combination and arrangements of parts hereinafter described and claimed.

The invention will be best understood by reference to the accompanying drawings showing the preferred form of construction and in which:

Fig. 3 is a fragmentary top plan view of the same;

Fig. 5 is a sectional detail view taken substantially on line 5—5 of Fig. 1.

Figure 1:
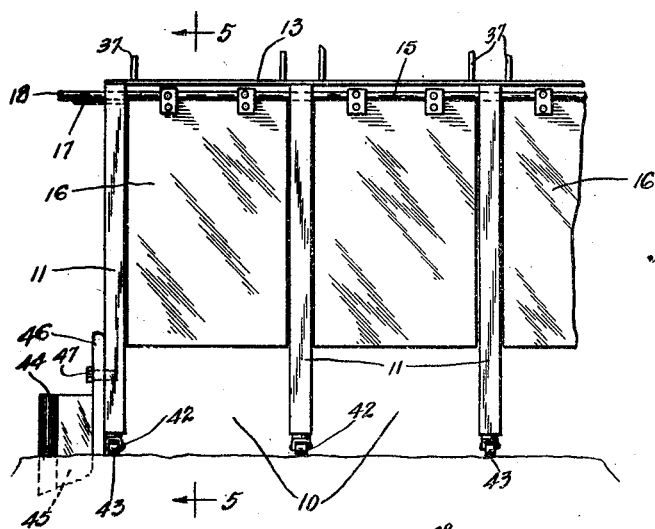
Fig. 1 is a fragmentary front elevational view of the invention.
Figure 2:
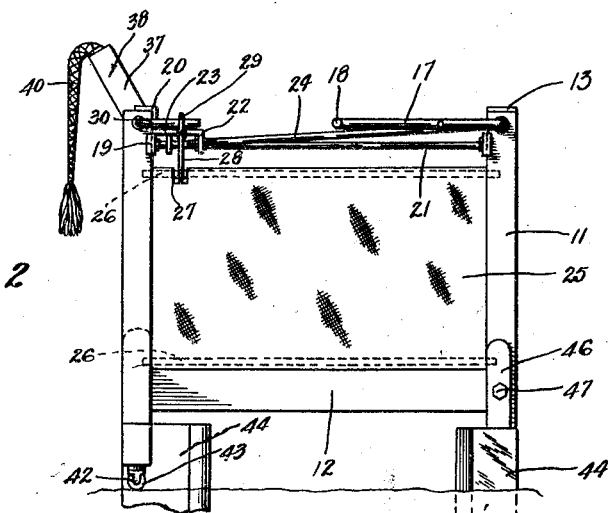
Fig. 2 is a typical side elevational view of the same.
Figure 4:
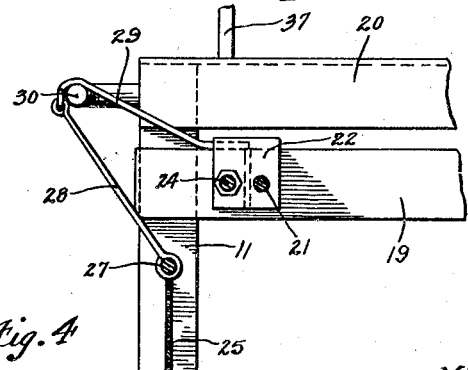
Fig. 4 is a fragmentary sectional detail view of the same taken substantially on line 4—4 of Fig. 3.

Referring more particularly to the drawings in which the preferred form of construction of my invention is shown my improved starting device or box for race horses or other racing animals includes one or more stalls 10 each of which are substantially of the same construction.

Each stall comprises corner posts 11, the front and rear posts being spaced from each other by means of side plates 12. The front posts are spaced from each other at the top thereof by means of a plate 13 and below this plate 13 the posts rotatably support an operated rod 15 which supports a door 16 which closes the front of the starting box or stall.

At this point it is pointed out that the doors to the stalls, where more than one stall is used, are suspended from this rod 15 so as to have simultaneous operation whereby the doors will open and close in unison.

Included preferably as a part of this rod 15 is an extended portion 17 which provides a handle 18 whereby the rod 15 may be manually or mechanically rotated to swing upwardly to the doors 16 whereby to allow the horses within the stalls to race therefrom.

The rear posts of each stall are spaced by means of two plates 19 and 20, the plate 19 being spaced a predetermined distance from the plate 20 for reasons hereinafter set forth.

Supported transversely between the plate 19 and the plate 13 is a cylindrical bar 21 on which is slidably mounted a keeper plate 22 preferably formed substantially U-shaped and provided with an extended tongue 23 which is adapted to project, when the keeper plate is in its rearmost position, between the plates 19 and 20.

This keeper plate is connected to the operating handle 17 by means of a rod 24 as best shown in Fig. 3 whereby when the operating rod 17 is rotated to swing the door of each stall upwardly the keeper plate 22 will be moved forward.

Above the side plates 12 visibility between the stalls is prevented by suitable curtains 25 suspended between rods 26 supported by the posts of the stalls. Connected to the upper of the rods 26 as at 27 is a link 28 which has pivotally connected to its free end a latch 29. This latch 29 is adapted to project over an arm 30 and have its unsecured end positioned under the keeper plate 22 within a depressed portion 31 thereof when the keeper plate 22 is in its rearmost position.

This arm 30 is formed as a part of a rod 32 which is rotatably supported by the rear posts of the stall.

Upon the rod 32 there is positioned a coil spring 33. This coil spring 33 has one end 34 positioned upon the edge 35 of the plate 19.

Fixed to the rod 32 between the rear posts of the stall are the ends 36 of limbs 37 of a U-shaped plate 38. The opposite end 39 of the spring 33 rests upon the adjacent limb 37 of the plate 38 whereby when the spring is placed under tension it will have a tendency to rotate the rod 32 so as to move the U-shaped plate into whip-like action downwardly toward the rear of the stall.

This U-shaped plate carries a plurality of whip elements 40 which are spaced along the bight 41 of the plate.

The posts are mounted upon wheels 42 preferably bearing rubber tires 43 for obvious reasons.

When the starting device or box is positioned properly upon the racing course the two diagonal corresponding posts of each of the stalls are positioned adjacent a platform 44 which has its lower end 45 embedded in the body of the course and each of these platforms provides an upstanding arm 46 which is detachably secured to the adjacent post by means of a removable bolt 47 whereby to hold the starting device or box stationary during the running of a race.

The operation in use of my improved starting device or box is as follows:

The horses are led into the stalls through the rear thereof. At this point the door of each stall is in lowered position with the arm 30 turned forward to raise the U-shaped plate 38 and place the spring 33 under tension. The arm is held in this position by the latch 29 which is positioned under the keeper plate 31. After the horses are arranged properly in the stalls the operator stands upon one of the platforms 44, firmly grasps the handle 18 and pulls the same downwardly so as to swing the doors of the stalls upwardly. At a point just preceding the highest elevation of the doors the rod 24 will move the keeper plate 22 forwardly upon the rod 21 so as to release the latch 29. Upon release of the latch 29 the spring 33 being under tension will rotate the rod 32 and move the U-shaped plate 38 downwardly so as to bring the whip elements 40 into whip action against the rear of the horses thus starting and involuntarily urging the horses forward upon the open race course.

It will be thus seen that the arrangement is such that the horses will be caused to proceed along the race course at a dashing start by reason of the contact of the whip elements with the horses.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A starting device for a race horse or other animal including a stall having an open rear and front, an upwardly swinging door normally closing the front, means supporting the door and rotatable to swing the door upwardly, means for rotating said door supporting means, a plurality of whip elements, means rotatably supporting the whip elements at the rear of the stall, means for urging said rotatable means into operation so as to bring the whip elements in whip-like action downwardly into the stall, means operated by the door operating means for controlling operation of said urging means, said last mentioned means including a supporting rod, a keeper plate slidably mounted on the rod, a connecting member between the keeper plate and the door supporting means, a latch member normally held in latch position by the keeper plate, and an arm on said rotatable means engaged by the latch plate to releasably hold the rotatable means against operation in direction to urge the whip elements into whip action.

2. A starting device for a race horse or other animal including a stall having an open rear and front, an upwardly swinging door normally closing the front, means supporting the door and rotatable to swing the door upwardly, means for rotating said door supporting means, a plurality of whip elements, means rotatably supporting the whip elements at the rear of the stall, means for urging said rotatable means into operation so as to bring the whip elements in whip-like action downwardly into the stall, means operated by the door operating means for controlling operation of said urging means, said last mentioned means including a supporting rod, a slidable member on said rod, a member connecting said slidable member and the door supporting means, a latch member normally held in position by said slidable means to prevent movement of said rotatable means, and a member on said rotatable means adapted to be engaged by said last named member to control movement of said rotatable means.

In testimony whereof I affix my signature.

NICOLAS ALVAREZ LOPEZ.